No. 758,083. PATENTED APR. 26, 1904.
V. LAPP.
GRAIN GERMINATING APPARATUS.
APPLICATION FILED MAY 29, 1901.
NO MODEL. 2 SHEETS—SHEET 1.
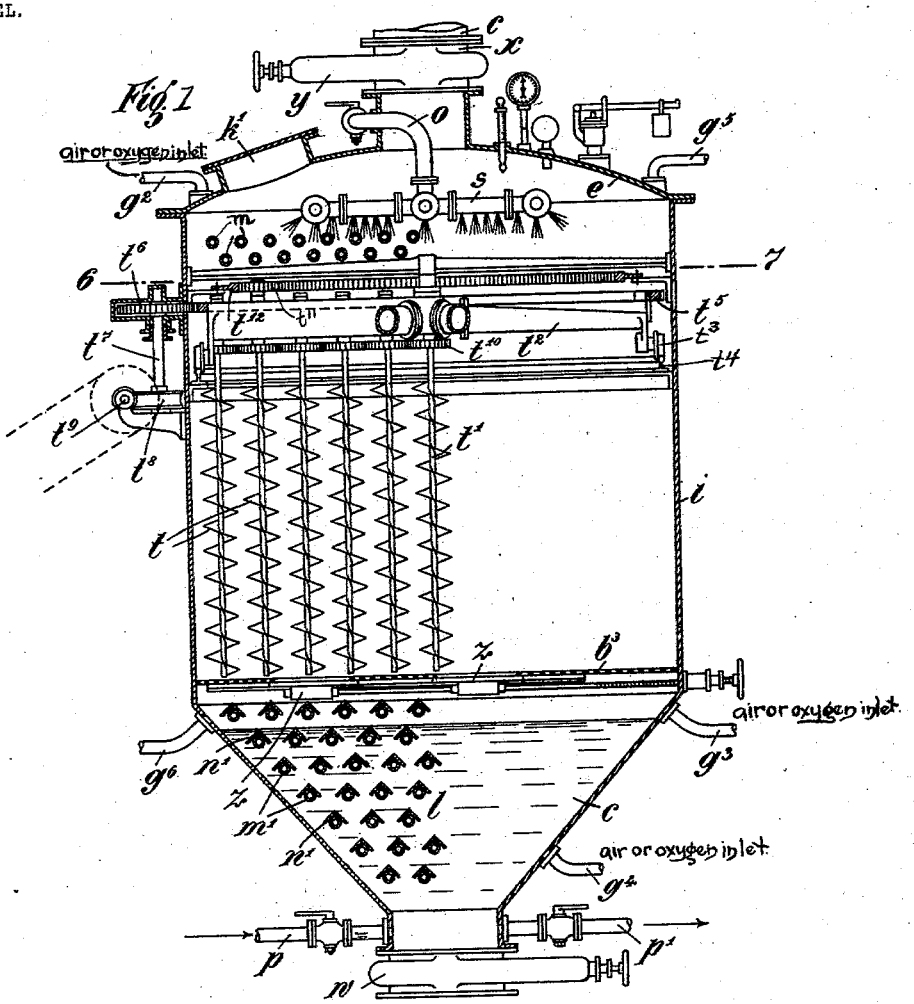
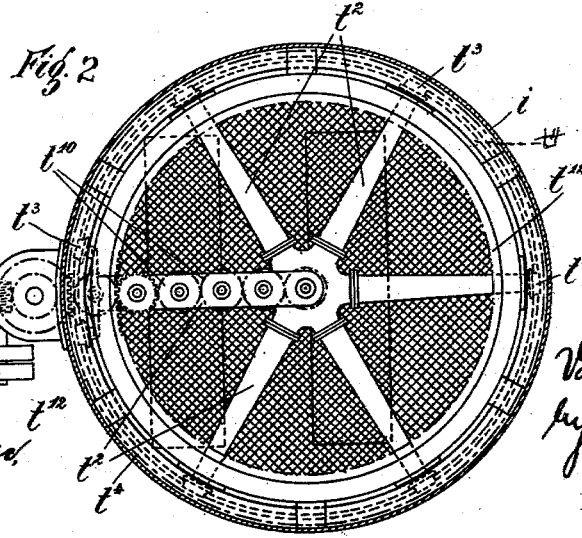

No. 758,083. PATENTED APR. 26, 1904.
V. LAPP.
GRAIN GERMINATING APPARATUS.
APPLICATION FILED MAY 29, 1901.
NO MODEL. 2 SHEETS—SHEET 2.

Witnesses
Edwin L. Yewell
Jas. L. Skidmore

Inventor.
Valentin Lapp
by B. Singer
his Attorney.

No. 758,083. Patented April 26, 1904.

UNITED STATES PATENT OFFICE.

VALENTIN LAPP, OF LEIPZIG, GERMANY.

GRAIN-GERMINATING APPARATUS.

SPECIFICATION forming part of Letters Patent No. 758,083, dated April 26, 1904.

Application filed May 29, 1901. Serial No. 62,310. (No model.)

*To all whom it may concern:*

Be it known that I, VALENTIN LAPP, brewer, a subject of the King of Saxony, residing at Lindenau, near Leipzig, in the Kingdom of Saxony, in the German Empire, have invented a new and Improved Grain-Germinating Apparatus, of which the following is a specification.

This invention relates to an apparatus for initiating and carrying through the germination of grain intended for the production of wort for beer; and my improvements consist in certain combinations and arrangements of parts, as are fully described hereinafter.

In order to make my invention more clear, I refer to the accompanying drawings, in which similar letters denote similar parts throughout the several views, and in which—

Figure 3:
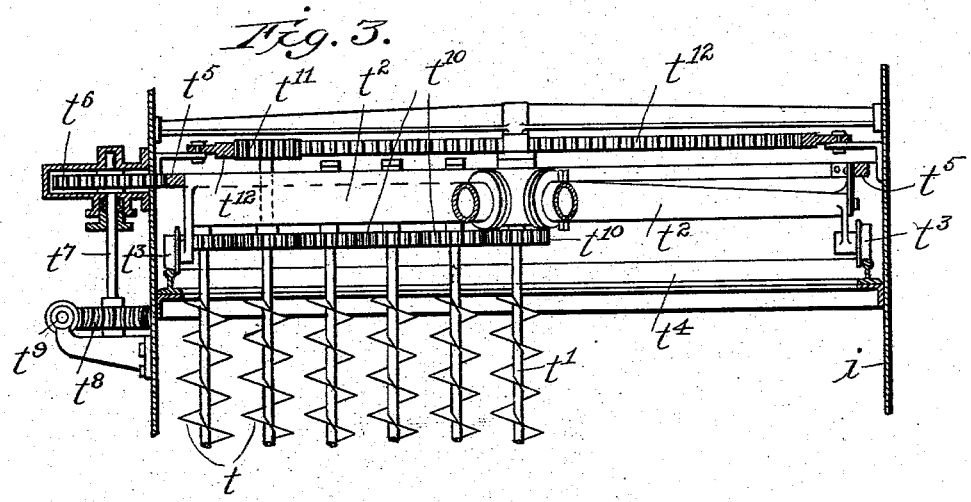
Figure 4:
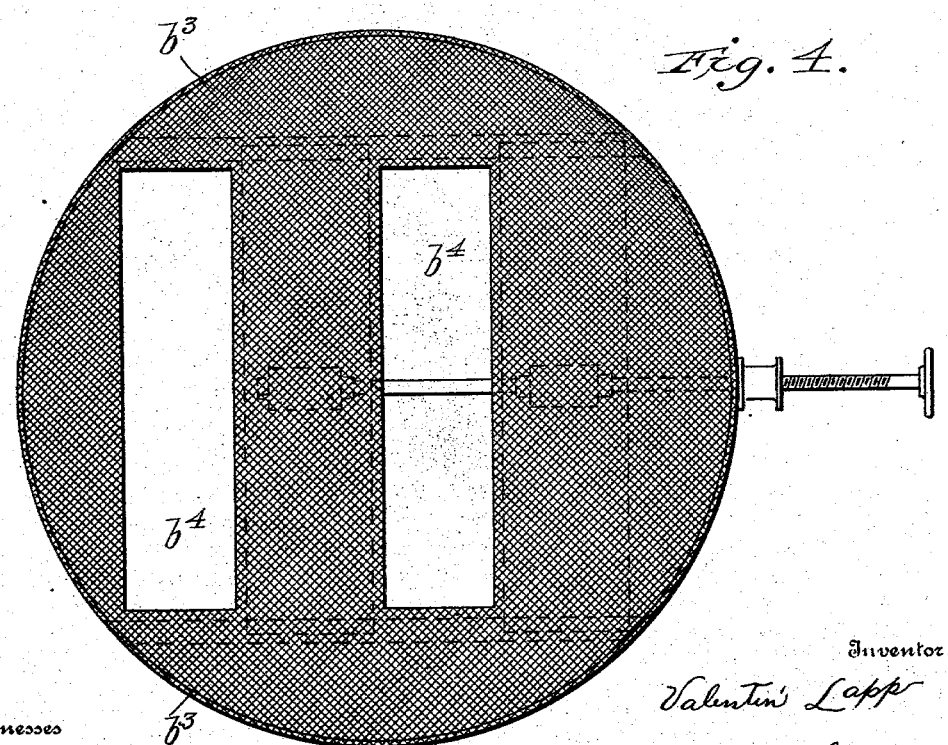

Figure 1 is a vertical section through my improved apparatus. Fig. 2 is a horizontal section through the same in line 6 7 of Fig. 1. Fig. 3 shows an enlarged portion of the upper half of Fig. 1. Fig. 4 is an enlarged separate view of the sieve-bottom $b^3$, the slides $z$, Fig. 1, being withdrawn.

The germination vessel $i$ is of cylindrical shape and provided with a perforated bottom (sieve-bottom) $b^3$ for supporting the grain. Below said bottom is a space $l$ for a water-bath and for cooling-pipes $m'$, which latter may be furnished with protective shields $n'$. The lower end of the funnel-shaped lower part $c$ of the germination vessel is closed by a suitable valve, such as a slide, the construction being of any suitable kind, a diagrammatic view of the same being shown at $w$. This slide is opened at the end of the whole process when the germinated grain is let out of the apparatus.

The vessel $i$ may be provided with inlet and outlet pipes $p$ $p'$ for leading, if necessary, fresh water to the grain, the pipe $p$ serving, for instance, for leading in the fresh water and the pipe $p'$ serving for leading off the foul water, and there are further provided pipes $g^2$ $g^3$ $g^4$ for leading compressed air or oxygen and liquid air into said vessel, the pipe $g^2$ serving, for instance, for leading in the compressed air or oxygen and the pipe $g^3$ serving for leading in liquid air below the sieve-bottom $b^3$, whereas the pipe $g^4$ serves for leading the liquid air into and through the water contained in the part $c$ of the vessel. I wish it, however, to be understood that the pipes $g^3$ $g^4$ may also be employed for the introduction of compressed air; but the pipe $g^2$ is never employed for the introduction of liquid air, the latter being led in exclusively either through $g^3$ or through $g^4$, dependent on whether the air entering through said pipes shall be laden with moisture or not. At the cover or lid of the vessel $i$ is a device $s$ (spray, perforated pipes, or the like) for distributing water in a finely-divided state over and upon the grain, and, if desired, also cooling-pipes $m$ may be arranged in the upper part of the vessel $i$ above the grain.

It will be understood that water or air of the required temperature may be passed through the pipes $m$ or $m'$ to either raise or lower the temperature in the vessel $i$ to the degree desired.

The vessel may be provided with means for stirring the grain—for instance, helixes $t$—and these may be so arranged as to be adapted to rotate in one or the other direction. In the form of construction shown in Figs. 1 and 3 the shafts $t'$ of the helixes $t$ extend downward from one of six radial arms $t^2$, having rolls $t^3$, adapted to run upon a circular rail $t^4$, fixed to the wall of the casing $i$. That of the six arms from which the shafts $t'$ extend downward is reinforced—that is to say, it is thicker and stronger than the other arms and has the same section throughout its entire length. The arms $t^2$ hold a circular rack $t^5$, gearing with a cog-wheel $t^6$, located outside the casing $i$, and the shaft $t^7$ of said cog-wheel has a worm-wheel $t^8$, gearing with a worm $t^9$. The shaft of the latter is connected with any suitable motor or engine. The upper parts of the shafts $t'$ are provided below the respective arm $t^2$ with cog-wheels $t^{10}$, each of which is in gear with its neighboring one or ones, and one of said shafts (the second with respect to the wall of the casing) is provided also above the respective arm $t^2$ with a cog-wheel $t^{11}$, gearing with a circular rack $t^{12}$, located above the rack $t^5$, but having a smaller diameter. Therefore by rotating the worm $t^9$ the helixes $t$ are made to rotate as well as to revolve, so as thereby to stir the grain. There is further an opening $c$ for introducing the steeped grain into the vessel $i$, and in the sieve-bottom $b^3$ are openings $z$, through which the grain may pass down into the space $c$ and away through an exit-opening $w$, located at the lower part of said space. Also a thermometer, a hygrometer, a manometer, and a safety-valve are provided.

To quickly and conveniently transfer the grain into the vessel $i$, the vessel for steeping the grain is preferably arranged directly over the vessel, and both are connected with each other by a casing $x$, adapted to be closed by a slide $y$.

When the steeped grain has entered the vessel $i$, compressed air, or what is preferred, oxygen is introduced into said vessel through the pipe $g^2$.

During the first two days the grain is kept on a temperature of 15° centigrade, and after this time the temperature is raised to 16° centigrade, while during the last half-day a temperature of preferably from about 18° to 20° centigrade is made use of. As soon as the grain has reached the temperature desired the latter may be at once lowered, so as to avoid a further dissolution of the grain. For raising the temperature air or water of a suitable degree of temperature is led through the uppermost series of the pipes $m$, and for lowering it air or water of a suitable degree of temperature is led through the pipes $m'$. During the germination period also liquid air may be led to and into the grain, this kind of air exerting an especially advantageous and accelerating action upon the germination and the dissolution of the grain. One liter of liquid air is used for one hundred hundred-weights of grain. By leading liquid air of a kind which contains only little nitrogen, but much oxygen, to the grain this latter is more quickly and thoroughly dissolved in that the oxidation in the interior of the grains proceeds more easily and the dissolving action of the cytase and diastase in the grain is materially promoted by the oxygen as well as by the pressure. The dissolution proceeds very quickly in a perfect manner.

If during the process of germination another supply of water appears necessary, that water is added, preferably, in a finely-distributed state—for instance, by means of a spray—and is directed upon the upper part of the grain, so that by this means the grain is constantly or temporarily moistened again, just as required. Any excess of water is let off at the lower part of the grain—i. e., at the bottom of the vessel. In this manner the grain which is just about to germinate may be moistened again as oftentimes as required, or it may be even completely soaked, just as the case may be. Also in one or the other of these cases the germinating wet grain may be temporarily exposed to a more or less powerful current of air, so as thereby to cause the grain to take up the water more rapidly.

The moistened compressed air may be led to the grain also from below, or it may be sucked through the grain in upward direction. In either case the pipe $g^3$ or the pipe $g^4$ is made use of.

Instead of ordinary air liquid air may be made to pass into and through the water, and this air may then be led through and into the germinating grain. By this means a highly perfect cooling and ventilation of the grain is obtained even if the latter forms an unusually thick layer. The perfect cooling is based on the fact that liquid air when heated and during expansion absorbs a very great quantity of heat, which is conducted away from the thick layer of grain or malt. By this means thicker layers of malt than hitherto employed may be caused to germinate at a time, and owing to the energetic cooling of the malt the carbonic acid is by far better removed from the same. The malt takes up the air or oxygen more easily even if but a low temperature is used.

The carbonic acid developing at the commencement or during the first period of the germination may be sucked off, if desired, in an upward or in a downward direction by means of pipes $g^5$ $g^6$, the first, $g^5$, being located above the grain, the other, $g^6$, below. At the same time compressed air may be led to the grain or malt either from below (through the pipe $g^3$) or from above, (through the pipe $g^2$,) as the case may be, that air being preferably employed in a cooled state. After the enzymes have formed within the germinating grain the natural development proceeds without any other supply of oxygen being required. When this period in the formation of the enzymes has been reached, which occurs and is chiefly finished generally at the third day of the treatment of the germinating grain, the current of air passing through the grain is interrupted, and the germinating grain is exposed for a short time or temporarily (periodically) to the action of compressed air or of carbonic acid, and, if desired, liquid air may for a time be caused to pass through the germinating grain, so as to cool the same. The pressure should not be below one atmosphere and not above three. The complete dissolution or disintegration proceeds then very quickly in that the carbonic acid which forms in the malt itself and the pressure in this period exert a favorable influence upon the work of the cytase and diastase in the germinating grain without the coöperation of oxygen.

The carbonic acid formed in the malt is either sucked off the vessel from time to time or is allowed to remain inside said vessel, because it accumulates mainly below the germinating grain. From this space the carbonic acid may be sucked off either directly—for instance, by means of the pipe $g^6$—or in an upward direction through the grain—for instance, by means of the pipe $g^5$.

It is necessary during the process of germination to keep the grain cool. The cooling may be effected, for instance, in such a manner that the air entering through the pipe $g^2$ is caused to pass between the pipes $m$ above the grain and a cooling liquor is made to flow through said pipes, when the air thus cooled is sucked through the grain by means of the pipe $g^3$, so as to cool the same in its turn. Such cooling-pipes may also be used for cooling the water-bath below the grain. It is clear that by leading air—for instance, compressed air or liquefied air—into or through the thus cooled water a particularly low degree of cooling may be attained, so that even a thick layer of grain or malt may be kept cool by either forcing or sucking the thus cooled air through it.

Having now described my invention, what I desire to secure by a patent of the United States is—

1. The combination, in a grain-germinating apparatus, of a closed vessel, a false bottom inside the same; means for introducing water into and leading it away from the space below said bottom; means for conducting the grain to the bottom; apertures in the latter adapted to let the grain pass into said space when empty; means for closing said apertures; means for letting the grain leave the said space, and means for introducing air into, and conducting the carbonic acid out of, the said vessel, substantially as described.

2. The combination, in a grain-germinating apparatus, of a closed vessel, a false bottom inside the same; means for introducing water into, and leading it away from, the space below said bottom; means for introducing air into said space; means for conducting the grain to the said bottom; apertures in the latter adapted to let the grain pass into the said space when empty; means for closing said apertures; means for letting the grain leave said space, and means for conducting away the carbonic acid, substantially as described.

3. The combination, in a grain-germinating apparatus, of a closed vessel, a false bottom inside the same; means for introducing water into, and leading it away from, the space below said bottom; means for introducing air into said water; means for conducting the grain to the said bottom; apertures in the latter adapted to let the grain pass into the said space when empty; means for closing said apertures; means for letting the grain leave said space, and means for conducting away the carbonic acid, substantially as described.

4. The combination, in a grain-germinating apparatus, of a closed vessel, a false bottom inside the same; means for introducing water into, and leading it away from, the space below said bottom; means for introducing liquid air into the vessel; means for conducting the grain to the said bottom; apertures in the latter adapted to let the grain pass into the said space when empty; means for closing said apertures; means for letting the grain leave said space, and means for conducting away the carbonic acid, substantially as described.

5. The combination, in a grain-germinating apparatus, of a closed vessel, a false bottom inside the same; means for introducing water into, and leading it away from, the space below said bottom; means for introducing air into the space below and into the space above the said bottom; means for conducting the grain to the said bottom; apertures in the latter adapted to let the grain pass into the said space when empty; means for closing said apertures; means for letting the grain leave said space, and means for conducting away the carbonic acid, substantially as described.

6. The combination, in a grain-germinating apparatus, of a closed vessel, a false bottom inside the same; means for introducing water into, and leading it away from, the space below said bottom; cooling-pipes passing through said water; means for conducting the grain to the bottom; connections for leading air to said grain; apertures in said bottom adapted to let the grain pass into the said space when empty; means for closing said apertures; means for letting the grain leave said space, and means for conducting away the carbonic acid, substantially as described.

7. The combination, in a grain-germinating apparatus, of a closed vessel, a false bottom inside the same; means for introducing water into, and leading it away from, the space below said bottom; cooling-pipes passing through said space as well as through the upper space of the vessel; means for conducting the grain to the bottom; connections for leading air to said grain; apertures in said bottom adapted to let the grain pass into the said space when empty; means for closing said apertures; means for letting the grain leave said space, and means for conducting away the carbonic acid, substantially as described.

8. The combination, in a grain-germinating apparatus, of a closed vessel, a false bottom inside the same; means for introducing water into, and leading it away from, the space below said bottom; means for introducing air into said space; means for conducting the grain to said bottom; means for stirring the grain upon said bottom; apertures in the latter adapted to let the grain pass into the said space when empty; means for closing said apertures; means for letting the grain leave said space, and means for conducting away the carbonic acid, substantially as described.

In witness whereof I have hereunto set my hand in presence of two witnesses.

VALENTIN LAPP.

Witnesses:
 RUDOLPH FRICKE,
 CHAS. J. BURT.